Oct. 7, 1941.   A. H. BUCKLEY   2,258,405
ELECTRICALLY CONTROLLED MOTORIZED TYPEWRITER
Filed April 24, 1939   3 Sheets-Sheet 3
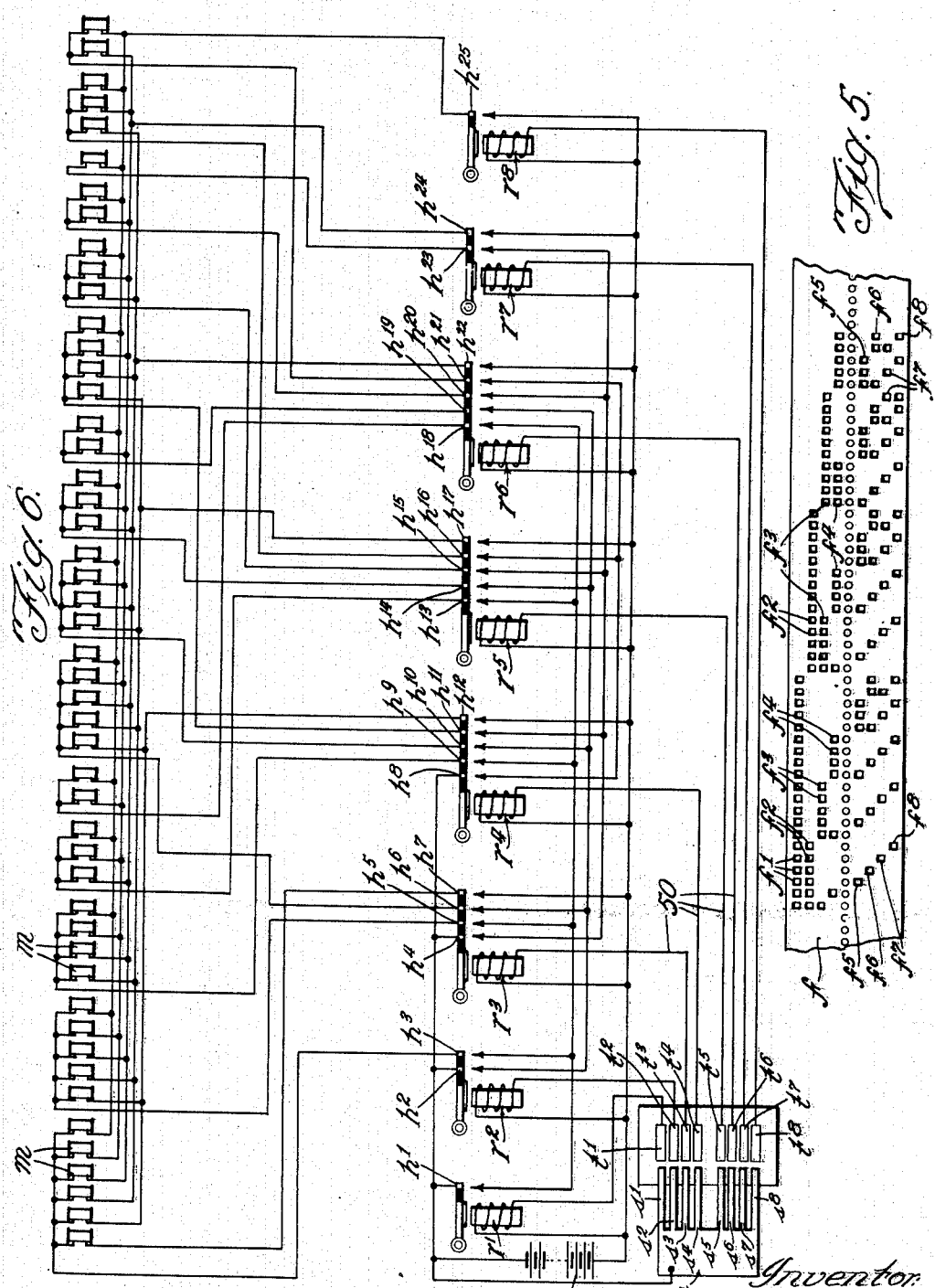

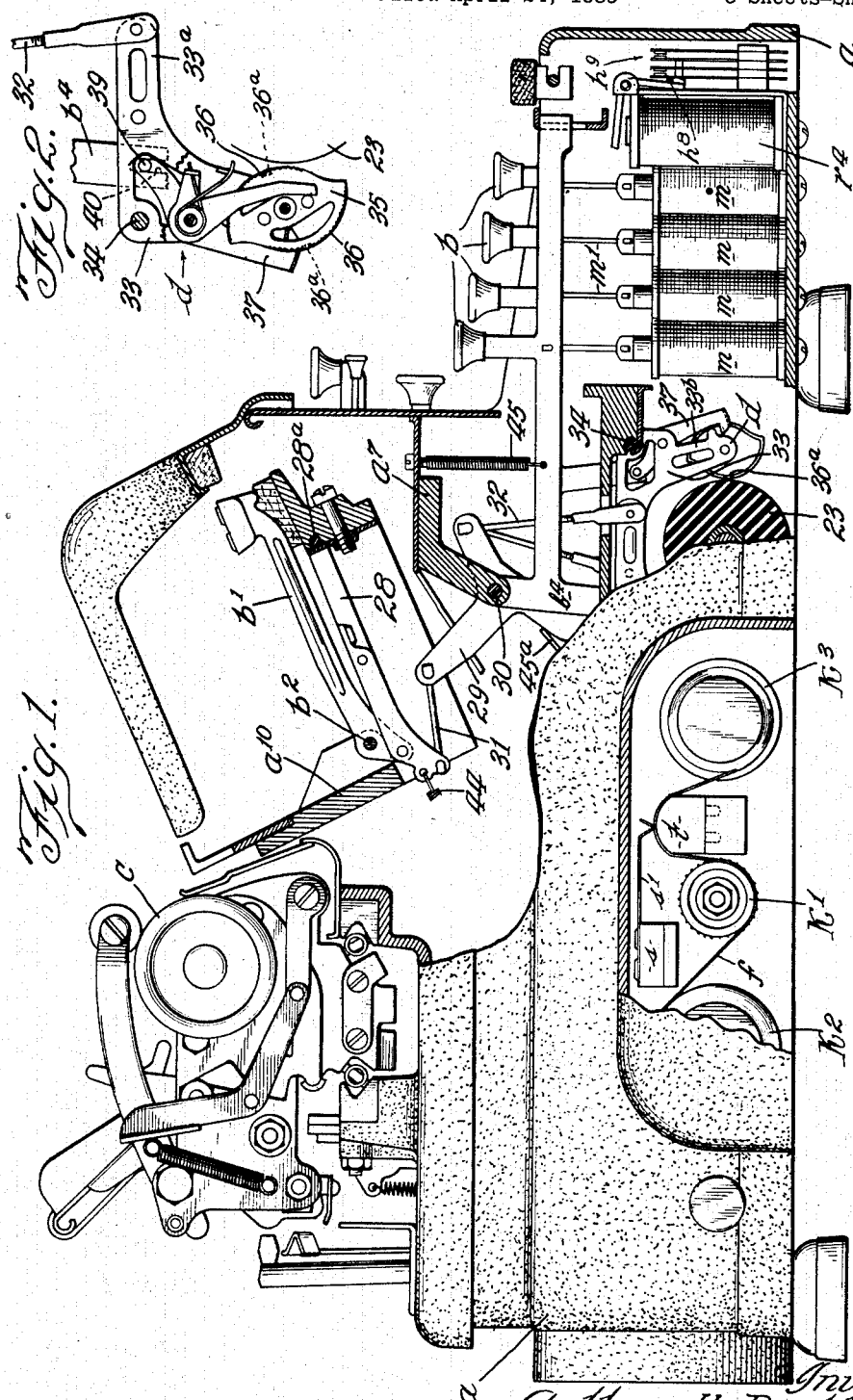

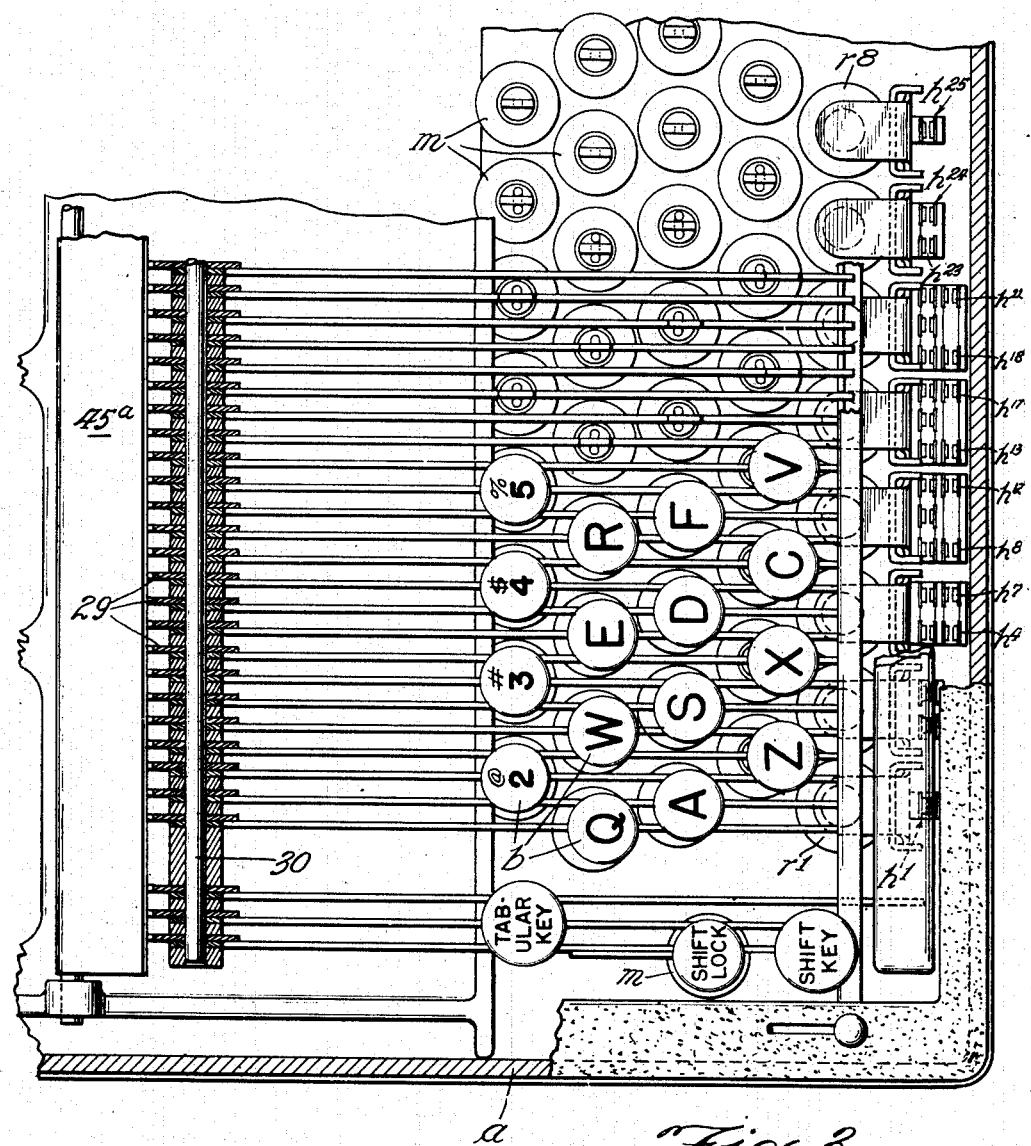
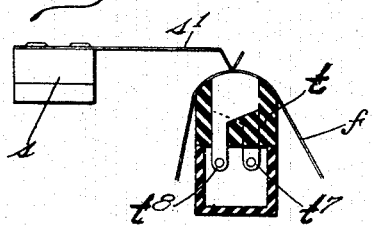

Patented Oct. 7, 1941

2,258,405

UNITED STATES PATENT OFFICE 2,258,405

ELECTRICALLY CONTROLLED MOTORIZED TYPEWRITER

Arthur H. Buckley, Chicago, Ill.

Application April 24, 1939, Serial No. 269,658

3 Claims. (Cl. 197—20)

The invention relates to automatic motorized typewriters.

One object of the invention is to provide improved electrically controlled mechanism for a motorized typewriter in which a relatively narrow tape or record is provided with successive rows of perforations which, through vertically operated switches, are adapted to control the operation of a full set of key-bars and other actions, such as the case-shift, spacers and carriage-return, to perform their functions by power from a continuously rotating element such as a driving roll, which is driven by an electric motor. For example, in the attainment of this object, the tape or record is provided with perforations on eight longitudinal lines and the perforations are permutably arranged transversely to selectively and permutably control switches for a set of electromagnetically controlled switches which, when permutably operated, will control a full set of magnets which control the power-operated devices for selectively shifting the type-bars and other actions. This makes it possible to individually control the operation of a full set of type-bars and other actions from a narrow record with not more than eight rows of perforations.

Another object of the invention is to provide simple and efficient automatic electrical control mechanism for a motorized typewriter, which is adapted for high speed operation.

Other objects of the invention will appear from the detailed description.

The invention consists in the several novel features which are hereinafter set forth and are more particularly defined by claims at the conclusion hereof.

In the drawings: Fig. 1 is a side elevation, parts being broken away, of a typewriter embodying the invention. Fig. 2 is a detail of one of the power-operable shifting devices for the type-bars and other actions. Fig. 3 is a plan of a portion of the key-bar of the typewriter. Fig. 4 is a section through the tracker-bar. Fig. 5 is a plan of a portion of the tape which is perforated in accordance with the invention. Fig. 6 is a diagram of the electrical connections.

The invention is exemplified as applied to a motorized typewriting machine, which comprises a frame $a$; a full set of key-levers $b$ for the usual number of type-bars $b^1$ and associated actions, such as a spacer-bar, shift-lock, tabulator, backspacer, case-shift, and carriage-return; a paper-carriage $c$ of usual construction; a driving roll 23 which is driven by an electric motor, as well understood in the art; and a series of devices $d$, each adapted to be coupled to and uncoupled from roll 23, and to shift, by power, a connection for operating one of the type-bars $b^1$ or one of the associated actions. Devices $d$ are alternately arranged at the front and in the rear of roll 23 for compactness. These devices $d$ are alike in construction and may be of any suitable construction known in the art for imparting operative strokes to the type-bars from a driving roll in motorized typewriters. The mechanism for driving roll 23 and the construction of the devices $d$ are described in detail in an application filed by me February 23, 1939, Serial No. 257,775, now Patent No. 2,247,275, issued June 24, 1941, to which reference may be had for the details thereof. Roll 23 extends laterally across the machine to drive the entire set of devices $d$ and is suitably journaled in the frame $a$.

Key-levers $b$ are fulcrumed on a rod 30 which is supported in a member $a^7$ of the frame $a$. Each key-lever is held normally raised by a spring 45 and is provided with a leg $b^4$ having a slot 40 for a stud 39 on the upper end of the controller-dog 37 for one of the shifting devices $d$. Depression of the key-levers controls, through dogs 37, the individual operation of the devices $d$.

All of the type-bars $b^1$ are fulcrumed on a rod $b^2$ which is supported in a shiftable frame $a^{10}$ for upper and lower case printing, as well understood in the art. Each type-bar is operable by an angular lever 33 of one of the shifting devices $d$ by a connection comprising a toggle-lever 28, the front member of which is pivoted at $28a$ in frame $a^{10}$ and the rear member of which is pivoted to the type-bar; a link 31 pivoted to the rear member of toggle 28; a bell-crank lever 29 which is fulcrumed on rod 30 concentrically with key-levers $b$ and has one of its arms connected to link 31; and a link 32 between another arm of lever 29 and the arm $33^a$ of one of levers 33. A spring 44 is applied to each toggle for retracting the type-bar connected thereto. A spring $45^a$ is applied to levers 29 for retracting said levers, links 32 and the levers 33.

Each shifting device $s$ comprises one of the levers 33 which is fulcrumed on a rod 34 which is supported in a member of frame $a$ and comprises a horizontally extending arm $33^a$ which is connected to a link 32 and a vertically extending arm $33^b$. A rotatable element 35 with peripheral cam-faces 36 is supported in the lower end of each lever-arm $33^b$. Cam-faces 36 are normally disengaged from roll 23. Upon a slight rotation of element 35 on its own axis in arm $33^b$, one of its cam-faces 36 will engage roll 23 so the element will be rotated a cycle of one-half revolution to rock lever 33 on its fulcrum 34 to shift its arm $33^a$ for the operation, by power, of a type-bar or other device connected to said lever and at the end of said cycle element 35 will be automatically disengaged from the roll 23. A lever or dog 37 is pivoted in each lever 33 and engages stop-lugs $36^a$ at the end of each cycle to automatically stop the rotation of element 35 at the end of each cycle. These devices $d$ exemplify power-operable devices engageable with the drive-roll 23 for imparting strokes to the type-bars and associated actions, which are controlled by the key-levers $b$. When a lever $b$ is depressed, its leg $b^4$ will shift the dog 37 to release rotatable element 35 so it will be driven a cycle of approximately one-half a revolution by the engagement of one of the cams 36 with the roll. The lever 33 will, during this cycle, shift link 39 and the lever 29 connected thereto, to impart an operative stroke to a type-bar or other action. The automatic controlling mechanism for shifting the devices $d$ for initiating a power stroke, comprises a tracker-bar $t$ over which is fed a perforated tape $f$ by a suitable tape feed mechanism which comprises a feed-sprocket $k^1$, a supply-spool $k^2$ for the tape, and a take-up spool $k^3$ for the tape. The body of the tracker-bar is formed of insulating material and has embedded therein a series of eight contacts $t^1$, $t^2$, $t^3$, $t^4$, $t^5$, $t^6$, $t^7$, $t^8$, which are insulated from one another and extend to the face of the tracker-bar over which the tape $f$ is drawn. A conductor-plate $s$ is provided with eight contact-strips $s^1$, $s^2$, $s^3$, $s^4$, $s^5$, $s^6$, $s^7$, and $s^8$ for engaging, respectively, through the perforations in the tape, the contacts in the tracker-bar, respectively. Contact-plate $s$ is electrically connected to a battery $x$. The contacts $t^1$, $t^2$, $t^3$, $t^4$, $t^5$, $t^6$, $t^7$ and $t^8$ are respectively connected by conductors 50 to the helices of relay magnets $r^1$, $r^2$, $r^3$, $r^4$, $r^5$, $r^6$, $r^7$ and $r^8$, respectively, each of which comprises an armature and a switch controlled thereby.

A series of solenoid magnets $m$ is provided, one for each key-lever $b$, and the armatures of said magnets are respectively connected by links $m^1$ to said levers, so that when one of said magnets is energized it will depress the lever $b$ connected thereto and shift its leg $b^4$ to couple the associated shifting device $d$ into engagement with the driving roll 23.

The tape or record comprises perforations $f^1$, $f^2$, $f^3$, $f^4$, $f^5$, $f^6$, $f^7$, $f^8$ arranged along longitudinal lines with three perforations transversely aligned for each operation. The perforations on each transverse line are differentially arranged for permutative control of the contacts $t^1$, $t^2$, $t^3$, $t^4$, $t^5$, $t^6$, $t^7$, $t^8$ so that, though the permutative operation of magnets $r^1$, $r^2$, $r^3$, $r^4$, $r^5$, $r^6$, $r^7$, $r^8$, the entire series of forty-nine magnets $m$ will be controlled for individual operation of the key-levers $b$. The armature of magnet $r^1$ is adapted to operate a single switch $h^1$. The armature of magnet $r^2$ is adapted to close a pair of switches $h^2$, $h^3$. The armature of magnet $r^3$ is adapted to close a set of four switches $h^4$, $h^5$, $h^6$, and $h^7$. The armature of magnet $r^4$ is adapted to close a set of five switches $h^8$, $h^9$, $h^{10}$, $h^{11}$ and $h^{12}$. The armature of magnet $r^5$ is adapted to close a set of five switches $h^{13}$, $h^{14}$, $h^{15}$, $h^{16}$ and $h^{17}$. The armature of magnet $r^6$ is adapted to close a set of five switches $h^{18}$, $h^{19}$, $h^{20}$, $h^{21}$ and $h^{22}$. The armature of magnet $r^7$ is adapted to close two switches $h^{23}$ and $h^{24}$. The armature of magnet $r^8$ is adapted to close a single switch $h^{25}$.

The relay-magnets $r^1$ to $r^8$, inclusive, and their associated switches are disposed at the front of the keyboard, as illustrated in Fig. 1. The contacts of switches $h^1$ to $h^{25}$ inclusive, are connected to battery $x$ and to the magnets $m$, as diagrammatically illustrated in Fig. 6, so that by the permutable actuation of the magnets $r^1$ to $r^8$, inclusive, each of the key-levers $b$ will be individually controlled according to the permutations of three of the eight series of perforations in the record or tape $f$. The permutative arrangement of the perforations in the tape for operating a full set of 49 key-levers of the typewriter is exemplified in Fig. 5.

For the purpose of illustration the tape shown is perforated for controlling the key-levers successively from left to right, it being understood that in practice the tape will be perforated in code to reproduce any record desired. The operations of the key-levers by the tape shown in Fig. 5, commencing at the left, will be as follows:

When a set of transversely aligned perforations $f^1$, $f^2$, $f^3$ traverse the tracker-bar, three circuits will be closed at contacts $s^1$, $t^1$; $s^2$, $t^2$; $s^3$, $t^3$; respectively, to establish circuits which will energize magnets $r^1$, $r^2$, $r^3$ and close switches $h^1$ to $h^7$, inclusive, whereupon current will pass from battery $x$ through switches $h^1$, $h^3$, magnet $m$ for the first key (usually the shift-lock key) and switch $h^7$ to battery $x$ and said key will be depressed by said magnet $m$ to render operative the device $d$ connected to said key.

When a set of transversely aligned perforations $f^1$, $f^2$, $f^4$ traverse the tracker-bar, three circuits will be closed at contacts $s^1$, $t^1$; $s^2$, $t^2$; $s^4$, $t^4$; respectively, which will energize magnets $r^1$, $r^2$, $r^4$, and close switches $h^1$, $h^2$, $h^3$, $h^8$, $h^9$, $h^{10}$, $h^{11}$ and $h^{12}$, whereupon current will pass through switches $h^1$, $h^3$, magnet $m$ for the next key (usually the shift-key) and switch $h^{12}$ to battery $x$ and said key will be depressed by said magnet to render operative the shifting-device $d$ connected to said key.

When a set of transversely aligned perforations $f^1$, $f^2$, $f^5$ traverse the tracker-bar, three circuits will be closed at contacts $s^1$, $t^1$; $s^2$, $t^2$; $s^5$, $t^5$; respectively, to establish circuits which will energize magnets $r^1$, $r^2$, $r^5$ and close switches $h^1$, $h^2$, $h^3$, $h^{13}$ to $h^{17}$, inclusive, whereupon current will pass from battery $x$ through switches $h^1$, $h^3$, magnet $m$ for the next key (usually the tabulator-key) and switch $h^{17}$ to battery $x$ and said key will be depressed by said magnet to render operative the shifting-device $d$ controlled by said key.

When a set of transversely aligned perforations $f^1$, $f^2$, $f^6$ traverse the tracker-bar, three circuits will be closed at contacts $s^1$, $t^1$; $s^2$, $t^2$; $s^6$, $t^6$; respectively, to establish three circuits which will energize magnets $r^1$, $r^2$, $r^6$ and close switches $h^1$, $h^2$, $h^3$, $h^{18}$, $h^{19}$, $h^{20}$, $h^{21}$, $h^{22}$, whereupon current will pass from battery $x$ through switches $h^1$, $h^3$, magnet $m$ for the next key (usually for spacing) and switch $h^{22}$ to battery $x$ and said key will be depressed by said magnet to render operative the device $d$ controlled by said key.

When a set of transversely aligned perforations $f^1$, $f^2$, $f^7$ traverse the tracker-bar, three circuits will be closed at contacts $s^1$, $t^1$; $s^2$, $t^2$; $s^7$, $t^7$; respectively, to establish three circuits which will energize magnets $r^1$, $r^2$, $r^7$ and close switches $h^1$, $h^2$, $h^3$, $h^{23}$, $h^{24}$, whereupon current will pass from battery $x$ through switches $h^1$, $h^3$, magnet $m$ for the next key (usually for printing "Q") and switch $h^{24}$ to battery $x$ and said key will be depressed by said magnet to render operative the shifting device $d$ controlled by said key for an operative stroke.

When a set of transversely aligned perforations $f^1$, $f^2$, $f^8$, traverse the tracker-bar, three circuits will be closed at contacts $s^1$, $t^1$; $s^2$, $t^2$; $s^8$, $t^8$; respectively, which will energize magnets $r^1$, $r^2$, $r^8$, and close switches $h^1$, $h^2$ and $h^{25}$, whereupon current will pass through switches $h^1$, $h^3$, magnet $m$ for the next key (usually the key for printing "A") and switch $h^{25}$ to battery $x$ and said key will be depressed by said magnet to render operative shifting-device $d$ for said key.

When a set of transversely aligned perforations $f^1$, $f^3$, $f^4$ traverse the tracker-bar, three circuits will be closed at contacts $s^1$, $t^1$; $s^3$, $t^3$; $s^4$, $t^4$; respectively, which will energize magnets $r^1$, $r^3$, $r^4$ and close switches $h^1$, $h^4$, $h^5$, $h^6$, $h^7$, $h^8$, $h^9$, $h^{10}$, $h^{11}$ and $h^{12}$, whereupon current will pass through switches $h^1$, $h^5$, magnet $m$ for the next key (usually the key for printing "2") and switch $h^{12}$ to battery $x$ and said key will be depressed by said magnet to render operative shifting-device $d$ for said key.

When a set of transversely aligned perforations $f^1$, $f^3$, $f^5$ traverse the tracker-bar, three circuits will be closed at contacts $s^1$, $t^1$; $s^3$, $t^3$; $s^5$, $t^5$; respectively, which will energize magnets $r^1$, $r^3$, $r^5$ and close switches $h^1$, $h^4$, $h^5$, $h^6$, $h^7$, $h^{13}$, $h^{14}$, $h^{15}$, $h^{16}$ and $h^{17}$, whereupon current will pass through switches $h^1$, $h^5$, magnet $m$ for depressing the next key (usually the key for printing "Z") and switch $h^{17}$ to battery $x$ and said key will be depressed by said magnet to render operative shifting device $d$ for said key.

When a set of transversely aligned perforations $f^1$, $f^3$, $f^6$ traverse the tracker-bar, three circuits will be closed at contacts $s^1$, $t^1$; $s^3$, $t^3$; $s^6$, $t^6$; respectively, which will energize magnets $r^1$, $r^3$, $r^6$ and close switches $h^1$, $h^4$, $h^5$, $h^6$, $h^7$, $h^{18}$, $h^{19}$, $h^{20}$, $h^{21}$ and $h^{22}$, whereupon current will pass through switches $h^1$, $h^5$, magnet $m$ for the next key (usually the key "W") and switch $h^{22}$ to battery $x$ and said key will be depressed by said magnet to render operative shifting-device $d$ connected to said key.

When a set of transversely aligned perforations $f^1$, $f^3$, $f^7$ traverse the tracker-bar, three circuits will be closed at contacts $s^1$, $t^1$; $s^3$, $t^3$; $s^7$, $t^7$; respectively, to establish three circuits which will energize magnets $r^1$, $r^3$, $r^7$ and close swiches $h^1$, $h^4$, $h^5$, $h^6$, $h^7$, $h^{23}$, $h^{24}$ whereupon current will pass from battery $x$ through switches $h^1$, $h^6$, magnet $m$ for the next key (usually for printing "S") and switch $h^{24}$ to battery $x$ and said key will be depressed by said magnet to render operative the shifting-device $d$ controlled by said key.

When a set of transversely aligned perforations $f^1$, $f^3$, $f^8$ traverse the tracker-bar, three circuits will be closed at contacts $s^1$, $t^1$; $s^3$, $t^3$; $s^8$, $t^8$; respectively, to establish three circuits which will energize magnets $r^1$, $r^3$, $r^8$ and close switches $h^1$, $h^4$, $h^5$, $h^6$, $h^7$, $h^{25}$, whereupon current will pass from battery $x$ through switches $h^1$, $h^6$, magnet $m$ for the next key (usually for printing "3") and switch $h^{25}$ to battery $x$ and said key will be depressed by said magnet to render operative the device $d$ controlled by said key.

When a set of transversely aligned perforations $f^1$, $f^4$, $f^5$ traverse the tracker-bar, three circuits will be closed at contacts $s^1$, $t^1$; $s^4$, $t^4$; $s^5$, $t^5$; respectively, to establish three circuits which will energize magnets $r^1$, $r^4$, $r^5$ and close switches $h^1$, $h^9$, $h^{10}$, $h^{11}$, $h^{12}$, $h^{13}$, $h^{14}$, $h^{15}$, $h^{16}$, $h^{17}$, whereupon current will pass from battery $x$ through switches $h^1$, $h^{17}$, magnet $m$ for the next key (usually for printing "X") and switch $h^9$ to battery $x$ and said key will be depressed by said magnet to render operative the device $d$ controlled by said key.

When a set of transversely aligned perforations $f^1$, $f^4$, $f^6$ traverse the tracker-bar, three circuits will be closed at contacts $s^1$, $t^1$; $s^4$, $t^4$; $s^6$, $t^6$; respectively, to establish three circuits which will energize magnets $r^1$, $r^4$, $r^6$ and close switches $h^1$, $h^8$, $h^9$, $h^{10}$, $h^{11}$, $h^{12}$, $h^{18}$, $h^{19}$, $h^{20}$, $h^{21}$ and $h^{22}$, whereupon current will pass from battery $x$ through switches $h^1$, $h^9$, magnet $m$ for the next key (usually for printing "E") and switch $h^{17}$ to battery $x$ and said key will be depressed by said magnet to render operative the device $d$ controlled by said key.

When a set of transversely aligned perforations $f^1$, $f^4$, $f^7$ traverse the tracker-bar, three circuits will be closed at contacts $s^1$, $t^1$; $s^4$, $t^4$; $s^7$, $t^7$; respectively, to establish three circuits which will energize magnets $r^1$, $r^4$, $r^7$ and close switches $h^1$, $h^8$, $h^9$, $h^{10}$, $h^{11}$, $h^{12}$, $h^{22}$, $h^{23}$, whereupon current will pass from battery $x$ through switches $h^1$, $h^5$, magnet $m$ for the next key (usually for printing "D") and switch $h^{24}$ to battery $x$ and said key will be depressed by said magnet to render operative the device $d$ controlled by said key.

When a set of transversely aligned perforations $f^1$, $f^4$, $f^8$ traverse the tracker-bar, three circuits will be closed at contacts $s^1$, $t^1$; $s^4$, $t^4$; $s^8$, $t^8$; respectively, to establish three circuits which will energize magnets $r^1$, $r^4$, $r^8$ and close switches $h^1$, $h^8$, $h^9$, $h^{10}$, $h^{11}$, $h^{12}$, $h^{25}$, whereupon current will pass from battery $x$ through switches $h^1$, $h^{13}$, magnet $m$ for the next key (usually for printing "4") and switch $h^{25}$ to battery $x$ and said key will be depressed by said magnet to render operative the shifting device $d$ controlled by said key for an operative stroke.

When a set of transversely aligned perforations $f^1$, $f^5$, $f^6$ traverse the tracker-bar, three circuits will be closed at contacts $s^1$, $t^1$; $s^5$, $t^5$; $s^6$, $t^6$; respectively, to establish three circuits which will energize magnets $r^1$, $r^5$, $r^6$ and close switches $h^1$, $h^{13}$, $h^{14}$, $h^{15}$, $h^{16}$, $h^{17}$, $h^{18}$, $h^{19}$, $h^{20}$, $h^{21}$, $h^{22}$, whereupon current will pass from battery $x$ through switches $h^1$, $h^3$, magnet $m$, for the next key (usually for printing "C") and switch $h^{22}$ to battery $x$ and said key will be depressed by said magnet to render operative the shifting device $d$ controlled by said key.

When a set of transversely aligned perforations $f^1$, $f^5$, $f^7$ traverse the tracker-bar, three circuits will be closed at contacts $s^1$, $t^1$; $s^5$, $t^5$; $s^7$, $t^7$; respectively, to establish circuits which will energize magnets $r^1$, $r^5$, $r^7$ and close switches $h^1$, $h^{13}$, $h^{14}$, $h^{15}$, $h^{16}$, $h^{17}$, $h^{23}$ to $h^{24}$, inclusive, whereupon current will pass from battery $x$ through switches $h^1$, $h^{13}$, magnet $m$ for the next key (usually for printing "R") and switch $h^{24}$ to battery $x$ and said key will be depressed by said magnet to render operative the shifting device $d$ controlled by said key.

When a set of transversely aligned perforations $f^2$, $f^4$, $f^5$ traverse the tracker-bar three circuits will be closed at contacts $s^1$, $t$; $s^5$, $t^5$; $s^8$, $t^8$; respectively to establish circuits which will energize magnets $r^1$, $r^5$, $r^8$ and close switches $h^1$, $h^{13}$, $h^{14}$, $h^{15}$, $h^{16}$, $h^{17}$, $h^{25}$, whereupon current will pass from battery $x$ through switches $h^1$, $h^{13}$, magnet $m$ for the next key (usually for printing "F") and switch $h^{25}$ to battery $x$ and said key will be depressed by said magnet to render operative the shifting device $d$ controlled by said key.

When a set of transversely aligned perforations $f^1$, $f^6$, $f^7$ traverse the tracker-bar three circuits will be closed at contacts $s^1$, $t^1$; $s^6$, $t^6$; $s^7$, $t^7$; respectively to establish three circuits which will energize magnets $r^1$, $r^6$, $r^7$ and close switches $h^1$, $h^{18}$, $h^{19}$, $h^{20}$, $h^{21}$, $h^{22}$, $h^{25}$, whereupon current will pass from battery $x$ through switches $h^1$, $h^{18}$, magnet $m$ which is connected to the next key (usually for printing "5") and switch $h^{24}$ to battery $x$ and said key will be depressed by said magnet to render operative the shifting device $d$ controlled by said key.

When a set of transversely aligned perforations $f^1$, $f^6$, $f^8$ traverse the tracker-bar, three circuits will be closed at contacts $s^1$, $t^1$; $s^6$, $t^6$; $s^8$, $t^8$; respectively, to establish three circuits which will energize magnets $r^1$, $r^6$, $r^8$ and close switches $h^1$, $h^{18}$, $h^{19}$, $h^{20}$, $h^{21}$, $h^{22}$, $h^{25}$, whereupon current will pass from battery $x$ through switches $h^1$, $h^{22}$, magnet $m$ which is connected to the next key (usually for printing "V") and switch $h^{25}$ to battery $x$ and said key will be depressed by said magnet to render operative the shifting device $d$ controlled by said key.

When a set of transversely aligned perforations $f^2$, $f^3$, $f^4$ traverse the tracker-bar, three circuits will be closed at contacts $s^2$, $t^2$; $s^3$, $t^3$; $s^4$, $t^4$; respectively, to establish three circuits which will energize magnets $r^2$, $r^3$, $r^4$ and close switches $h^2$, $h^3$, $h^4$ to $h^{12}$, inclusive, whereupon current will pass from battery $x$ through switches $h^2$, $h^6$, magnet $m$ which is connected to the next key (usually for printing "T") and switch $h^{12}$ to battery $x$ and said key will be depressed by said magnet to render operative the shifting device $d$ controlled by said key.

When a set of transversely aligned perforations $f^2$, $f^3$, $f^5$ traverse the tracker-bar three circuits will be closed at contacts $s^2$, $t^2$; $s^3$, $t^3$; $s^5$, $t^5$; respectively, to establish three circuits which will energize magnets $r^2$, $r^3$, $r^5$ and close switches $h^2$ to $h^7$, inclusive, $h^{13}$ to $h^{17}$, inclusive, whereupon current will pass from battery $x$ through switches $h^2$, $h^6$, magnet $m$ which is connected to the next key (usually for printing "G") and switch $h^{17}$ to battery $x$ and said key will be depressed by said magnet to render operative the shifting device $d$ controlled by said key.

When a set of transversely aligned perforations $f^2$, $f^3$, $f^6$ traverse the tracker-bar, three circuits will be closed at contacts $s^2$, $t^2$; $s^3$, $t^3$; $s^6$, $t^6$; respectively, to establish three circuits which will energize magnets $r^2$, $r^3$, $r^6$ and close switches $h^2$ to $h^7$, inclusive, $h^{18}$ to $h^{22}$, inclusive, whereupon current will pass from battery $x$ through switches $h^2$, $h^{19}$, magnet $m$ which is connected to the next key (usually for printing "6") and switch $h^{22}$ to battery $x$ and said key will be depressed by said magnet to render operative the shifting device $d$ controlled by said key.

When a set of transversely aligned perforations $f^2$, $f^3$, $f^7$ traverse the tracker-bar, three circuits will be closed at contacts $s^2$, $t^2$; $s^3$, $t^3$; $s^7$, $t^7$; respectively, to establish three circuits which will energize magnets $r^2$, $r^3$, $r^7$ and close switches $h^2$, $h^3$, $h^4$, $h^5$, $h^6$, $h^7$, $h^{23}$, $h^{24}$, whereupon current will pass from battery $x$ through switches $h^2$, $h^{19}$, magnet $m$ which is connected to the next key (usually for printing "B") and switch $h^{24}$ to battery $x$ and said key will be depressed by said magnet to render operative the shifting device $d$ controlled by said key.

When a set of transversely aligned perforations $f^2$, $f^3$, $f^8$ traverse the tracker-bar, three circuits will be closed at contacts $s^2$, $t^2$; $s^3$, $t^3$; $s^8$, $t^8$; respectively, to establish three circuits which will energize magnets $r^2$, $r^3$, $r^8$ and close switches $h^2$, $h^3$, $h^4$ to $h^7$, inclusive, and $h^{25}$, whereupon current will pass from battery $x$ through switches $h^2$, $h^5$, magnet $m$ which is connected to the next key (usually for printing "H") and switch $h^{24}$ to battery $x$ and said key will be depressed by said magnet to render operative the shifting device $d$ controlled by said key.

When a set of transversely aligned perforations $f^2$, $f^4$, $f^5$ traverse the tracker-bar, three circuits will be closed at contacts $s^2$, $t^2$; $s^4$, $t^4$; $s^5$, $t^5$; respectively, to establish three circuits which will energize magnets $r^2$, $r^4$, $r^5$ and close switches $h^2$, $h^3$, $h^8$ to $h^{18}$, inclusive, whereupon current will pass from battery $x$ through switches $h^2$, $h^{10}$, magnet $m$ which is connected to the next key (usually for printing "7") and switch $h^{17}$ to battery $x$ and said key will be depressed by said magnet to render operative the shifting device $d$ controlled by said key.

When a set of transversely aligned perforations $f^2$, $f^4$, $f^6$ traverse the tracker-bar, three circuits will be closed at contacts $s^2$, $t^2$; $s^4$, $t^4$; $s^6$, $t^6$; respectively, to establish three circuits which will energize magnets $r^2$, $r^4$, $r^6$ and close switches $h^2$, $h^3$, $h^7$ to $h^{12}$, inclusive, and $h^{18}$ to $h^{22}$, inclusive, whereupon current will pass from battery $x$ through switches $h^2$, $h^{10}$, magnet $m$ which is connected to the next key (usually for printing "N") and switch $h^{22}$ to battery $x$ and said key will be depressed by said magnet to render operative the shifting device $d$ controlled by said key.

When a set of transversely aligned perforations $f^2$, $f^4$, $f^7$ traverse the tracker-bar, three circuits will be closed at contacts $s^2$, $t^2$; $s^4$, $t^4$; $s^7$, $t^7$; respectively, to establish three circuits which will energize magnets $r^2$, $r^4$, $r^7$ and close switches $h^2$, $h^3$, $h^8$ to $h^{12}$, inclusive, $h^{18}$ to $h^{22}$, inclusive, whereupon current will pass from battery $x$ through switches $h^2$, $h^{10}$, magnet $m$ which is connected to the next key (usually for printing "U") and switch $h^{22}$ to battery $x$ and said key will be depressed by said magnet to render operative the shifting device $d$ controlled by said key.

When a set of transversely aligned perforations $f^2$, $f^4$, $f^8$ traverse the tracker-bar, three circuits will be closed at contacts $s^2$, $t^2$; $s^4$, $t^4$; $s^8$, $t^8$; respectively, to establish three circuits which will energize magnets $r^2$, $r^4$, $r^8$ and close switches $h^2$, $h^3$, $h^8$ to $h^{12}$, inclusive, whereupon current will pass from battery $x$ through switches $h^2$, $h^{10}$, magnet $m$ which is connected to the next key (usually for printing "J") and switch $h^{25}$ to battery $x$ and said key will be depressed by said magnet to render operative the shifting device $d$ controlled by said key.

When a set of transversely aligned perforations $f^2$, $f^5$, $f^6$ traverse the tracker-bar, three circuits will be closed at contacts $s^2$, $t^2$; $s^5$, $t^5$; $s^6$, $t^6$; respectively, to establish three circuits which will energize magnets $r^2$, $r^5$, $r^6$, and close switches $h^2$, $h^3$, $h^{23}$, $h^{24}$, $h^{25}$ whereupon current will pass from battery $x$ through switches $h^2$, $h^{14}$, a magnet $m$ which is connected to the next key (usually for printing "8") and switch $h^{24}$ to battery $x$ and said key will be depressed by said magnet to render operative the shifting device $d$ controlled by said key.

When a set of transversely aligned perforations $f^2$, $f^5$, $f^7$ traverse the tracker-bar, three circuits will be closed at contacts $s^2$, $t^2$; $s^5$, $t^5$; $s^7$, $t^7$; respectively, to establish three circuits which will energize magnets $r^2$, $r^5$, $r^6$ and close switches $h^2$, $h^3$, $h^{13}$ to $h^{17}$, inclusive, $h^{23}$, and $h^{24}$, whereupon current will pass from battery $x$ through switches $h^2$, $h^{14}$, magnet $m$ which is connected to the next key (usually for printing "M") and switch $h^{24}$ to battery $x$ and said key will be depressed by said magnet to render operative the shifting device $d$ controlled by said key.

When a set of transversely aligned perforations $f^2$, $f^5$, $f^8$ traverse the tracker-bar, three circuits will be closed at contacts $s^2$, $t^2$; $s^5$, $t^5$; $s^8$, $t^8$; respectively, to establish three circuits which will energize magnets $r^2$, $r^6$, $r^7$, and close switches $h^2$, $h^3$, $h^{13}$ to $h^{17}$, inclusive, and $h^{25}$, whereupon current will pass from battery $x$ through switches $h^2$, $h^{14}$, magnet $m$ which is connected to the next key (usually for printing "I") and switch $h^{25}$ to battery $x$ and said key will be depressed by said magnet to render operative the shifting device $d$ controlled by said key.

When a set of transversely aligned perforations $f^2$, $f^6$, $f^7$ traverse the tracker-bar, three circuits will be closed at contacts $s^2$, $t^2$; $s^6$, $t^6$; $s^7$, $t^7$; respectively, to establish circuits which will energize magnets $r^2$, $r^6$, $r^7$ and close switches $h^2$, $h^3$, $h^{23}$ to $h^{25}$, inclusive, whereupon current will pass from battery $x$ through switches $h^2$, $h^{19}$, magnet $m$ for the next key (usually for printing "K") and switch $h^{24}$ to battery $x$ and said key will be depressed by said magnet to render operative the shifting device $d$ controlled by said key.

When a set of transversely aligned perforations $f^2$, $f^6$, $f^8$ traverse the tracker-bar, three circuits will be closed at contacts $s^2$, $t^2$; $s^6$, $t^6$; $s^8$, $t^8$; respectively, to establish three circuits which will energize magnets $r^2$, $r^6$, $r^8$, and close switches $h^2$, $h^3$, $h^{18}$ to $h^{22}$, inclusive, and $h^{25}$, whereupon current will pass from battery $x$ through switches $h^2$, $h^{19}$, magnet $m$ which is connected to the next key (usually for printing "9") and switch $h^{25}$ to battery $x$ and said key will be depressed by said magnet to render operative the shifting device $d$ controlled by said key.

When a set of transversely aligned perforations $f^3$, $f^4$, $f^5$ traverse the tracker-bar, three circuits will be closed at contacts $s^3$, $t^3$; $s^4$, $t^4$; $s^5$, $t^5$; respectively, to establish three circuits which will energize magnets $r^3$, $r^4$, $r^5$ and close switches $h^4$ to $h^{17}$, inclusive, whereupon current will pass from battery $x$ through switches $h^4$, $h^{10}$, magnet $m$ which is connected to the next key (usually for printing a comma) and switch $h^{17}$ to battery $x$ and said key will be depressed by said magnet to render operative the shifting device $d$ controlled by said key.

When a set of transversely aligned perforations $f^3$, $f^4$, $f^6$ traverse the tracker-bar, three circuits will be closed at contacts $s^3$, $t^3$; $s^4$, $t^4$; $s^6$, $t^6$; respectively, to establish three circuits which will energize magnets $r^3$, $r^4$, $r^6$, and close switches $h^4$ to $h^{12}$, inclusive, and $h^{18}$ to $h^{22}$, inclusive, whereupon the current will pass from battery $x$ through switches $h^4$, $h^{11}$, magnet $m$ which is connected to the next key (usually for printing "O") and switch $h^{22}$ to battery $x$ and said key will be depressed by said magnet to render operative the shifting device $d$ controlled by said key.

When a set of transversely aligned perforations $f^3$, $f^4$, $f^7$ traverse the tracker-bar, three circuits will be closed at contacts $s^3$, $t^3$; $s^4$, $t^4$; $s^7$, $t^7$; respectively, to establish three circuits which will energize magnets $r^3$, $r^4$, $r^7$ and close switches $h^4$ to $h^{12}$, inclusive, $h^{23}$ and $h^{24}$, whereupon the current will pass from battery $x$ through switches $h^4$, $h^{11}$, magnet $m$ which is connected to the next key (usually for printing "L") and switch $h^{24}$ to battery $x$ and said key will be depressed by said magnet to render operative the shifting device $d$ controlled by said key.

When a set of transversely aligned perforations $f^3$, $f^4$, $f^8$ traverse the tracker-bar, three circuits will be closed at contacts $s^3$, $t^3$; $s^4$, $t^4$; $s^8$, $t^8$; respectively, to establish three circuits which will energize magnets $r^3$, $r^4$, $r^8$, and close switches $h^4$ to $h^{12}$, inclusive, and $h^{25}$, whereupon the current will pass from battery $x$ through switches $h^4$, $h^{11}$, magnet $m$ which is connected to the next key (usually for printing zero) and switch $h^{25}$ to battery $x$ and said key will be depressed by said magnet to render operative the shifting device $d$ controlled by said key.

When a set of transversely aligned perforations $f^3$, $f^5$, $f^6$ traverse the tracker-bar, three circuits will be closed at contacts $s^3$, $t^3$; $s^5$, $t^5$; $s^6$, $t^6$; respectively, to establish three circuits which will energize magnets $r^3$, $r^5$, $r^6$, and close switches $h^4$ to $h^7$, inclusive, and $h^{13}$ to $h^{22}$, inclusive, whereupon the current will pass from battery $x$ through switches $h^4$, $h^{16}$, magnet $m$ which is connected to the next key (usually for printing a period) and switch $h^{22}$ to battery $x$ and said key will be depressed by said magnet to render operative the shifting device $d$ controlled by said key.

When a set of transversely aligned perforations $f^3$, $f^5$, $f^7$ traverse the tracker-bar, three circuits will be closed at contacts $s^3$, $t^3$; $s^5$, $t^5$; $s^7$, $t^7$; respectively, to establish three circuits which will energize magnets $r^3$, $r^5$, $r^7$, and close switches $h^4$ to $h^7$, inclusive, $h^{13}$ to $h^{17}$, inclusive, $h^{23}$, and $h^{24}$, whereupon the current will pass from battery $x$ through switches $h^4$, $h^{16}$, magnet $m$ which is connected to the next key (usually for printing "P") and switch $h^{24}$ to battery $x$ and said key will be depressed by said magnet to render operative the shifting device $d$ controlled by said key.

When a set of transversely aligned perforations $f^3$, $f^5$, $f^8$ traverse the tracker-bar, three circuits will be closed at contacts $s^3$, $t^3$; $s^5$, $t^5$; $s^8$, $t^8$; respectively, to establish three circuits which will energize magnets $r^3$, $r^5$, $r^7$ and close switches $h^4$ to $h^7$, inclusive, $h^{13}$ to $h^{17}$, inclusive, and $h^{25}$, whereupon current will pass from battery $x$ through switches $h^4$, $h^{15}$, magnet $m$ which is connected to the next key (usually for printing a semicolon) and switch $h^{25}$ to battery $x$ and said key will be depressed by said magnet to render operative the shifting device $d$ controlled by said key for an operative stroke.

When a set of transversely aligned perforations $f^3$, $f^6$, $f^7$ traverse the tracker-bar, three circuits will be closed at contacts $s^3$, $s^t$; $s^6$, $t^6$; $s^7$, $t^7$; respectively, to establish three circuits which will energize magnets $r^3$, $r^6$, $r^7$ and close switches $h^4$ to $h^7$, inclusive, $h^{18}$ to $h^{24}$, inclusive, whereupon current will pass from battery $x$ through switches $h^4$, $h^{20}$, magnet $m$ which is connected to the next key (usually for printing a hyphen) and switch $h^{24}$ to battery $x$ and said key will be depressed by said magnet to render operative the shifting device $d$ controlled by said key.

When a set of transversely aligned perforations $f^3$, $f^6$, $f^8$ traverse the tracker-bar, three circuits will be closed at contacts $s^3$, $t^3$; $s^6$, $t^6$; $s^8$, $t^8$; respectively, to establish three circuits which will energize magnets $r^3$, $r^6$, $f^8$ and close switches $h^4$ to $h^7$, inclusive, $h^{18}$ to $h^{22}$, inclusive, $h^{25}$, whereupon current will pass from battery $x$ through switches $h^4$, $h^{15}$, magnet $m$ which is connected to the next key (usually for printing "/") and switch $h^{25}$ to battery $x$ and said key will be depressed by said magnet to render operative the shifting device $d$ controlled by said key.

When a set of transversely aligned perforations $f^3$, $f^7$, $f^8$ traverse the tracker-bar, three circuits will be closed at contacts $s^3$, $t^3$; $s^7$, $t^7$; $s^8$, $t^8$; respectively, to establish circuits which will energize magnets $r^3$, $r^7$, $r^8$, and close switches $h^4$ to $h^7$, inclusive, $h^{23}$ to $h^{25}$, inclusive, whereupon current will pass from battery $x$ through switches $h^4$, $h^{23}$, magnet $m$ for the next key (usually for printing "½") and switch $h^{25}$ to battery $x$ and said key will be depressed by said magnet to render operative the shifting device $d$ controlled by said key.

When a set of transversely aligned perforations $f^4$, $f^5$, $f^6$ traverse the tracker-bar, three circuits will be closed at $s^4$, $t^4$; $s^5$, $t^5$; $s^6$, $t^6$; respectively, to establish circuits which will energize magnets $r^4$, $r^5$, $r^6$ and close switches $h^8$ to $h^{25}$, inclusive, whereupon current will pass from battery $x$ through switches $h^8$, $h^{16}$, magnet $m$ for the next key (usually for printing an apostrophe) and switch $h^{22}$ to battery $x$ and said key will be depressed by said magnet to render operative the shifting device $d$ controlled by said key.

When a set of transversely aligned perforations $f^4$, $f^5$, $f^7$ traverse the tracker-bar, three circuits will be closed at contacts $s^4$, $t^4$; $s^5$, $t^5$; $s^7$, $t^7$; respectively, to establish circuits which will energize magnets $r^4$, $r^5$, $r^7$, and close switches $h^8$ to $h^{17}$, inclusive, $h^{23}$, $h^{24}$, whereupon current will pass from battery $x$ through switches $h^8$, $h^{16}$, magnet $m$ for the next key (usually the stop-key) and switch $h^{24}$ to battery $x$ and said key will be depressed by said magnet to render operative the shifting device $d$ controlled by said key.

When a set of transversely aligned perforations $f^4$, $f^5$, $f^8$ traverse the tracker-bar, three circuits will be closed at contacts $s^4$, $t^4$; $s^5$, $t^5$; $s^8$, $t^8$; respectively, to establish circuits which will energize magnets $r^4$, $r^5$, $r^8$, and close switches $h^8$ to $h^{17}$, inclusive, $h^{25}$, whereupon current will pass from battery $x$ through switches $h^8$, $h^{16}$, magnet $m$ for the next key (usually for back-spacing) and switch $h^{25}$ to battery $x$ and said key will be depressed by said magnet to render operative the shifting device $d$ controlled by said key.

When a set of transversely aligned perforations $f^4$, $f^6$, $f^7$ traverse the tracker-bar, three circuits will be closed at contacts $s^4$, $t^4$; $s^6$, $t^6$; $s^7$, $t^7$; respectively, to establish circuits which will energize magnets $r^4$, $r^6$, $r^7$ and close switches $h^8$ to $h^{12}$, inclusive, $h^{18}$ to $h^{24}$, inclusive, whereupon current will pass from battery $x$ through switches $h^8$, $h^{21}$, magnet $m$ for the next key (usually the right-hand shift-key) and switch $h^{24}$ to battery $x$ and said key will be depressed by said magnet to render operative the shifting device $d$ controlled by said key.

When a set of transversely aligned perforations $f^4$, $f^6$, $f^8$ traverse the tracker-bar, three circuits will be closed at contacts $s^4$, $t^4$; $s^6$, $t^6$; $s^8$, $t^8$; respectively, to establish circuits which will energize magnets $r^4$, $r^6$, $r^8$ and close switches $h^8$ to $h^{12}$, inclusive, $h^{25}$, whereupon current will pass from battery $x$ through switches $h^8$, $h^{21}$, magnet $m$ for the next key (usually for the carriage return) and switch $h^{25}$ to battery $x$ and said key will be depressed by said magnet to render operative the shifting device $d$ controlled by said key.

When the tape between the perforations passes over the contacts in the tracker-bar, the circuits for operating the magnets $r^1$ to $r^8$, inclusive, will be interrupted and the key-levers $b$ will be restored to normal position.

The keys $b$ may be operated manually at any time to control the power operation of the type-bars and other actions because the keys are free to be depressed when the magnets $m$ are de-energized and through their legs $b^4$ control the shifting devices $d$.

The invention exemplifies automatic control mechanism for a motorized typewriter, by means of which permutatively arranged sets of three perforations control a set of eight electromagnetic switches which, in turn, individually control the full set of 49 motor-operated shifting devices for imparting power strokes to the type-levers and other actions, and is adapted for speedy and accurate power-operation of the typewriter.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In automatic control mechanism for a motorized typewriter, the combination of a full set of electromagnetic devices for individually controlling the operations of substantially all of the functional parts of the typewriter, a record provided with successive permutations of groups of at least three perforations for controlling said parts, a series of eight permutably operable electromagnets, a series of eight switching devices controlled by the magnets, respectively, and comprising switches connected to establish circuits for the individual operation of the full set of electromagnetic devices, and means controlled by the groups of perforations in the record for controlling the operation of the magnets in a sufficient number of permutations of three to control the switches controlled by the magnets for individually and selectively controlling the operation of the full set of electromagnetic devices.

2. In automatic control mechanism for a motorized typewriter, the combination of a full set of electromagnetic devices for individually controlling the operations of substantially all of the functional parts of the typewriter, a record provided with successive permutations of groups of at least three perforations for controlling said parts, a series of eight permutably operable electromagnets, a series of eight switching devices controlled by the magnets, respectively, and comprising switches connected to establish circuits for the individual operation of the full set of electromagnetic devices, and a set of switches controlled by the groups of perforations in the record for controlling the operation of the magnets in a sufficient number of permutations of three to control the switches controlled by the magnets for individually and selectively controlling the operation of the full set of electromagnetic devices.

3. In automatic control mechanism for a motorized typewriter, the combination of a full set of electromagnetic devices for individually controlling the operations of substantially all of the functional parts of the typewriter, a record provided with successive permutations of groups of at least three perforations for controlling said parts, a series of eight permutably operable electromagnets, a series of eight switching devices controlled by the magnets, respectively, and comprising switches connected to establish circuits for the individual operation of the full set of electromagnetic devices, and a set of eight switches controlled by the groups of perforations in the record for controlling the operation of the magnets in a sufficient number of permutations of three to control the switches controlled by the magnets for individually and selectively controlling the operation of the full set of electromagnetic devices.

ARTHUR H. BUCKLEY.